A. F. GLENN.
NUT LOCK.
APPLICATION FILED MAR. 8, 1920.
1,362,288.
Patented Dec. 14, 1920.
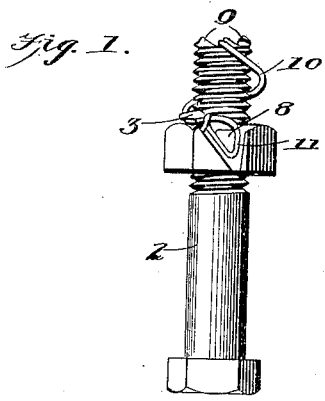
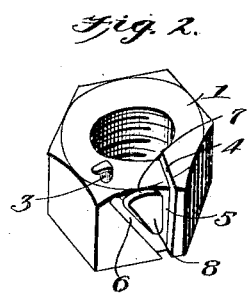
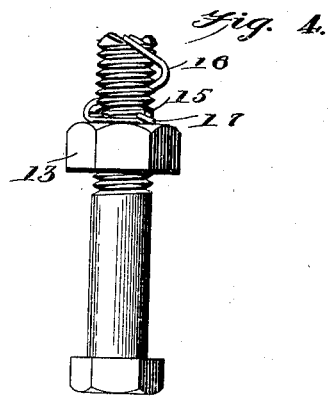
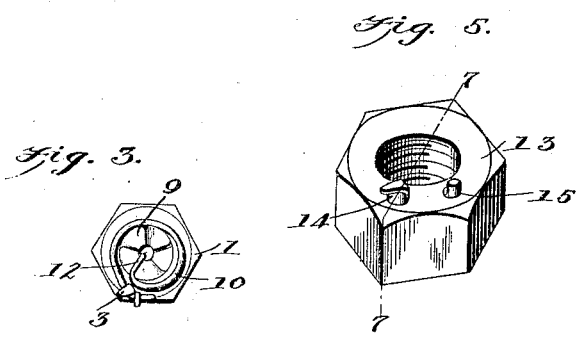
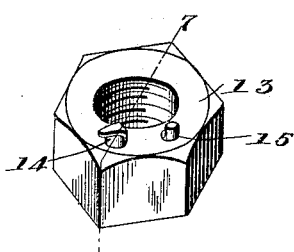
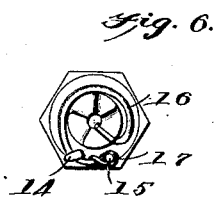
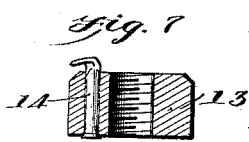
WITNESSES
INVENTOR
A. F. Glenn,
BY
ATTORNEYS

UNITED STATES PATENT OFFICE.

ARTHUR FIENE GLENN, OF BAKER, OREGON.

NUT-LOCK.

1,362,288.  Specification of Letters Patent.  Patented Dec. 14, 1920.

Application filed March 8, 1920. Serial No. 364,014.

*To all whom it may concern:*

Be it known that I, ARTHUR F. GLENN, a citizen of the United States, and a resident of Baker, in the county of Baker and State of Oregon, have invented certain new and useful Improvements in Nut-Locks, of which the following is a specification.

My invention is an improvement in nut locks, and the invention has for its object to provide a device of the character specified of simple and inexpensive construction, which does not extend beyond the peripheral face of the nut, permitting thus the use of socket wrenches, and which will hold the nut in any position with respect to the bolt, without the possibility of accidental displacement, and which may be easily released when desired.

In the drawings:

Figure 1 is a plan view of a bolt and nut provided with the improved lock;

Fig. 2 is a perspective view of the nut;

Fig. 3 is an end view of Fig. 1;

Fig. 4 is a view, similar to Fig. 1, of another embodiment of the invention;

Fig. 5 is a perspective view of the nut;

Fig. 6 is an end view of Fig. 4;

Fig. 7 is a section on the line 7—7 of Fig. 5.

In the embodiment of the invention shown in Figs. 1 and 2, the nut 1, which may be of any usual or desired formation, has on one face thereof, and on that face which will be remote from the head of the bolt 2 with which the nut is to be used, a headed pin 3. The face of the nut adjacent to the pin is cut away to form a shoulder 4 perpendicular to the plane of the nut at a little distance from the pin, the said shoulder extending from the bore or opening of the nut to the outer face thereof, and being substantially radial to the nut.

The shoulder faces the pin 3 and that portion of the face of the nut between the shoulder and the pin inclines downwardly to the base of the shoulder. That face of the polygonal periphery of the nut which is adjacent to the shoulder 4 is provided with a pair of grooves 5 and 6, the groove 5 extending from the shoulder 4, while the groove 6 extends from the pin 3, and the grooves converge and meet at the lower or inner face of the nut.

A portion of the face of the nut is cut away between the upper or outer ends of the grooves 5 and 6, as indicated at 7, and there is formed between the grooves 5 and 6 and the cut away portion 7 a lug 8 of substantially triangular shape. The threaded end of the bolt is provided with radial notches, each of which has a face parallel with the axis of the nut and a face inclined to the first named face, the grooves forming thus a series of ratchet teeth 9 all facing in the same direction, and in the direction toward which the nut is turned in turning it home.

The improved lock comprises a piece of wire 10 which is bent at one end to form a loop for engaging the lug 8. The wire, after the loop has been engaged with the lug 8, is bent beneath the head of the pin 3, and once around the threaded end of the bolt. The free end of the wire is bent radially inward to engage one of the teeth 9, and it will be evident that while the nut may be turned tighter it cannot be turned to loosen the same. When it is turned to tighten, the inturned end 12 of the wire slips over the teeth 9, but when the nut is turned in the opposite direction this inturned end engages the teeth and the turning of the nut tends to tighten that portion of the wire which is wrapped about the threaded end of the bolt and to move said portion into closer contact with the bolt.

In the embodiment of the invention shown in Figs. 5, 6 and 7, the nut 13 is provided with the headed pin 14, and with another pin 15 spaced apart from the pin 14 at about the same distance the shoulder 4 is spaced from the pin 3. The wire 16 has a loop 17 at one end for engaging the pin 15 and it is then passed beneath the headed pin 14 and engaged with the bolt in the same manner as shown in Fig. 1.

As shown in Fig. 7, the headed pin 14 may be formed by passing a rivet through a longitudinal opening in the nut, and bending that end of the pin remote from the head laterally. The pin 3 or 14 has merely a lateral projection to prevent outward movement of the wire when it is engaged beneath the same.

It will be noticed, referring to Figs. 3 and 6, that there is an axial opening in the end of the bolt, for receiving the end of the angular portion 12 of the wire. The end of the wire is bent angularly and inserted into this opening, to insure a better grip of the wire on the bolt.

I claim:

1. A nut lock comprising in combination with the nut and the bolt, of a lock comprising a length of resilient wire having at one end a loop, the nut having means for engagement by the loop to connect the wire to the nut, the said wire being curved spirally to engage about the threaded end of the bolt, said bolt having ratchet teeth at its end and the wire having an angular portion for engagement by the teeth, said teeth being arranged to resist movement of the angular portion when the nut is loosened.

2. A nut lock comprising a length of resilient wire having at one end a loop and bent spirally to engage about the bolt and having at the end remote from the loop an inwardly extending angular portion adapted to extend across the end of the bolt, said nut having means for engagement by the loop, and the bolt having ratchet teeth at its end for engagement by the lug.

3. A nut lock comprising a length of resilient wire having at one end a loop and bent spirally to engage about the bolt and having at the end remote from the loop an inwardly extending angular portion adapted to extend across the end of the bolt, said nut having means for engagement by the loop, and the bolt having teeth at its end for engagement by the lug.

ARTHUR FIENE GLENN.